United States Patent
Valkaitis

(10) Patent No.: US 11,652,612 B2
(45) Date of Patent: May 16, 2023

(54) SHARING ACCESS TO DATA

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 55 days.

(21) Appl. No.: 17/492,656

(22) Filed: Oct. 3, 2021

(65) Prior Publication Data
US 2023/0101596 A1 Mar. 30, 2023

Related U.S. Application Data

(63) Continuation of application No. 17/481,255, filed on Sep. 21, 2021.

(51) Int. Cl.
*H04L 9/08* (2006.01)
*H04L 9/30* (2006.01)
*H04L 9/06* (2006.01)

(52) U.S. Cl.
CPC .......... *H04L 9/3073* (2013.01); *H04L 9/0618* (2013.01)

(58) Field of Classification Search
CPC ... H04L 9/0637; H04L 9/0816; H04L 9/0819; H04L 9/0822; H04L 9/0825; H04L 9/0838; H04L 9/0841; H04L 9/30; H04L 9/3013; H04L 63/0435; H04L 63/061
See application file for complete search history.

(56) References Cited

U.S. PATENT DOCUMENTS

| | | | |
|---|---|---|---|
| 11,316,685 B1 * | 4/2022 | Doherty | H04L 9/0841 |
| 2005/0044356 A1 | 2/2005 | Srivastava et al. | |
| 2006/0010324 A1 | 1/2006 | Appenzeller et al. | |
| 2014/0115327 A1 | 4/2014 | Gorbach et al. | |

* cited by examiner

*Primary Examiner* — Minh Dinh
(74) *Attorney, Agent, or Firm* — The Pattani Law Group

(57) ABSTRACT

A method including determining, by a first device, a sharing encryption key based at least in part on an access private key associated with encrypted content and an assigned public key associated with a second device; encrypting the access private key associated with the encrypted content utilizing the sharing encryption key; and transmitting the encrypted access private key to enable the second device to access the encrypted content. Various other aspects are contemplated.

20 Claims, 7 Drawing Sheets

SHARING ACCESS TO DATA

CROSS REFERENCE

This application is a continuation of U.S. Non-Provisional patent application Ser. No. 17/481,255, filed on Sep. 21, 2021, and titled "Sharing Access To Data," the entire contents of which are incorporated herein by reference.

FIELD OF DISCLOSURE

Aspects of the present disclosure generally relate to use of computer hardware and/or software to manage data, and in particular to sharing access to data.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. In an example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method comprising determining, by a first user device, a sharing encryption key based at least in part on an access private key associated with encrypted content and an assigned public key associated with a second user device; encrypting the access private key associated with the encrypted content utilizing the sharing encryption key; and transmitting the encrypted access private key to enable the second user device to access the encrypted content.

In another aspect, the present disclosure contemplates a device comprising a memory and a processor communicatively coupled to the memory, the processor being configured to: determine a sharing encryption key based at least in part on an access private key associated with encrypted content and an assigned public key associated with a second user device; encrypt the access private key associated with the encrypted content utilizing the sharing encryption key; and transmit the encrypted access private key to enable the second user device to access the encrypted content.

In another aspect, the present disclosure contemplates a non-transitory computer readable medium storing instructions, which when executed by a processor cause the processor to: determine a sharing encryption key based at least in part on an access private key associated with encrypted content and an assigned public key associated with a second user device; encrypt the access private key associated with the encrypted content utilizing the sharing encryption key; and transmit the encrypted access private key to enable the second user device to access the encrypted content.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
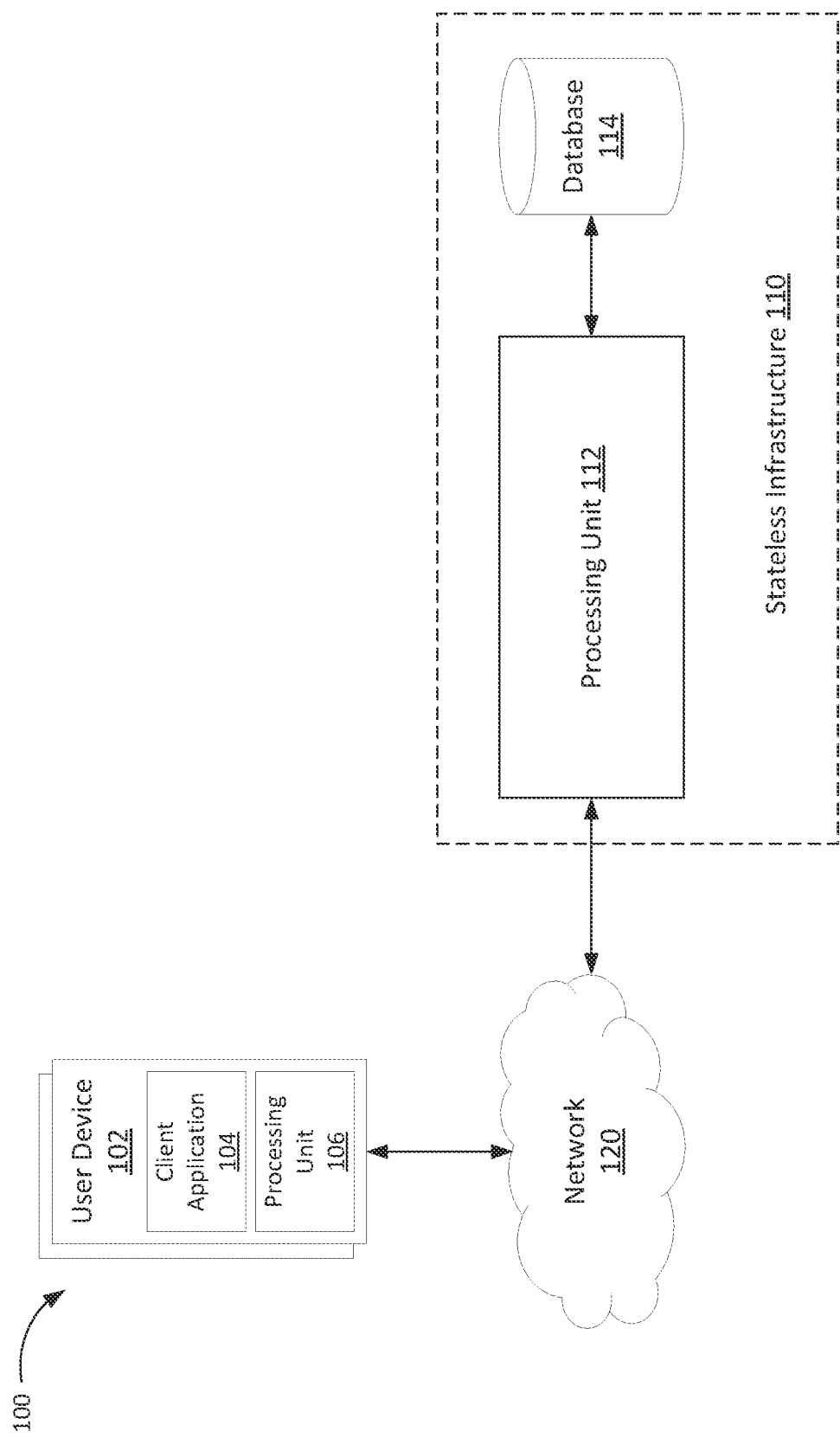

FIG. 1 is an illustration of an example system associated with sharing access to data, according to various aspects of the present disclosure.

Figure 2:
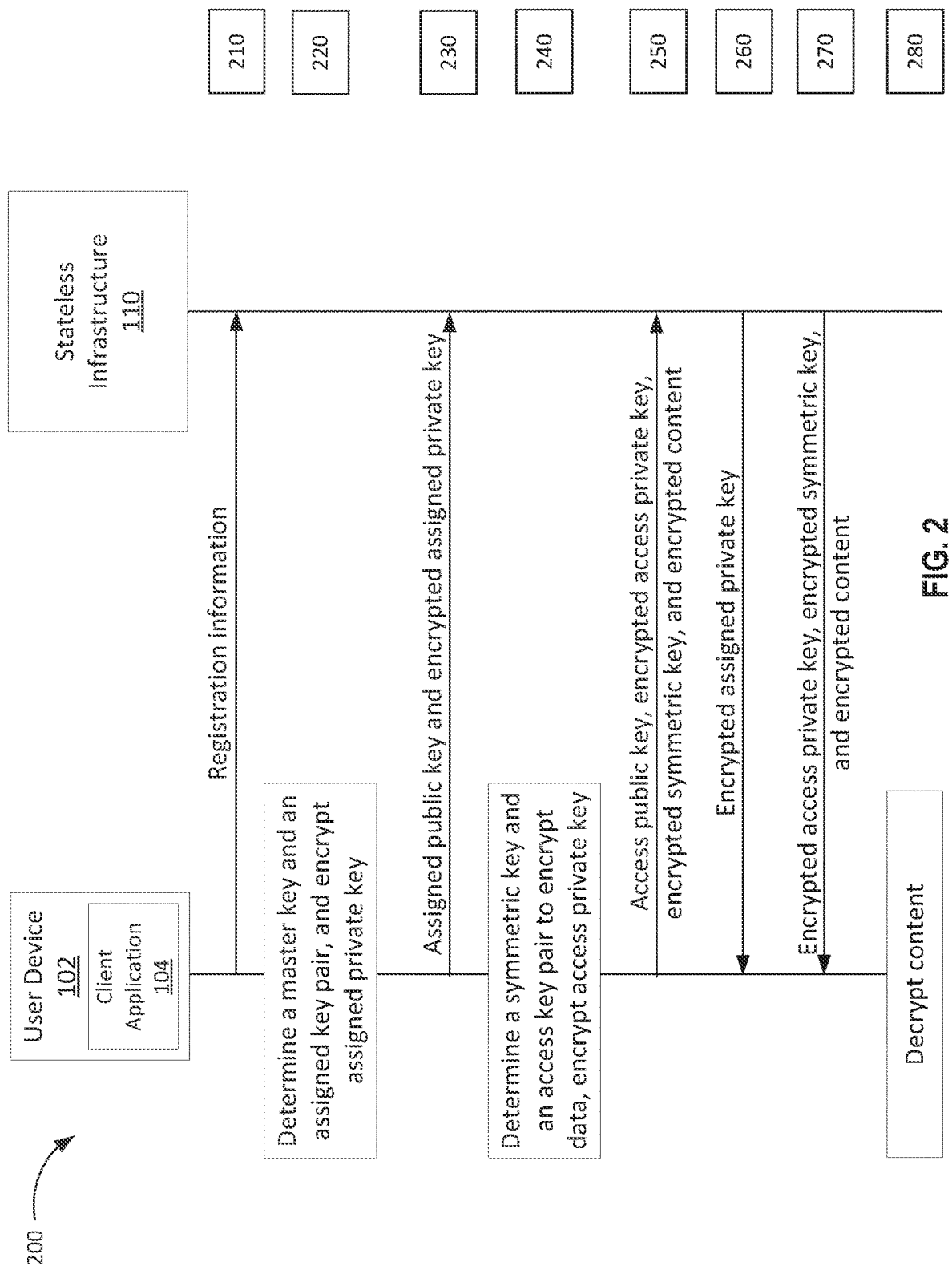

FIG. 2 is an illustration of an example flow associated with sharing access to data, according to various aspects of the present disclosure.

Figure 3:
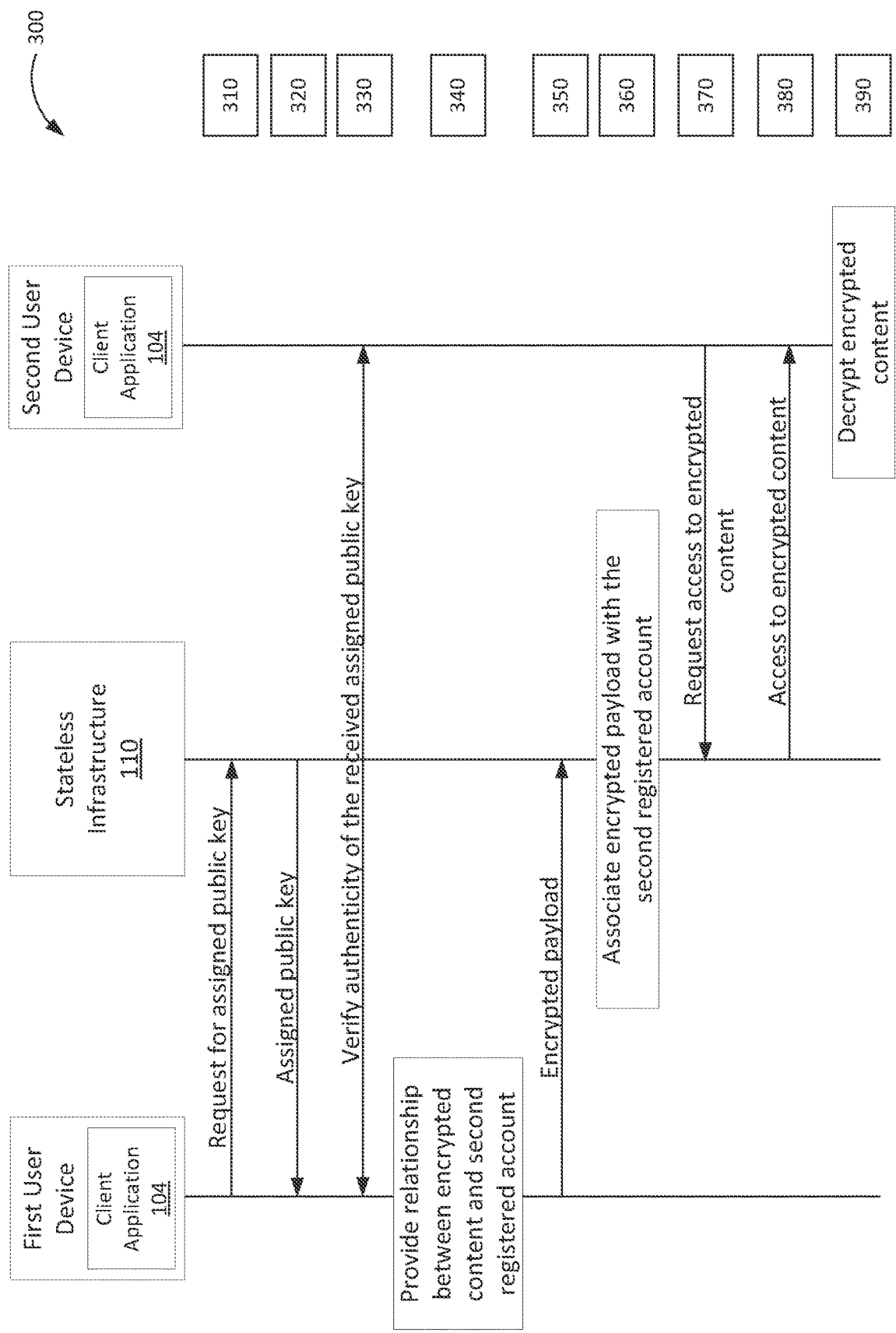

FIG. 3 is an illustration of an example flow associated with sharing access to data, according to various aspects of the present disclosure.

Figure 4:
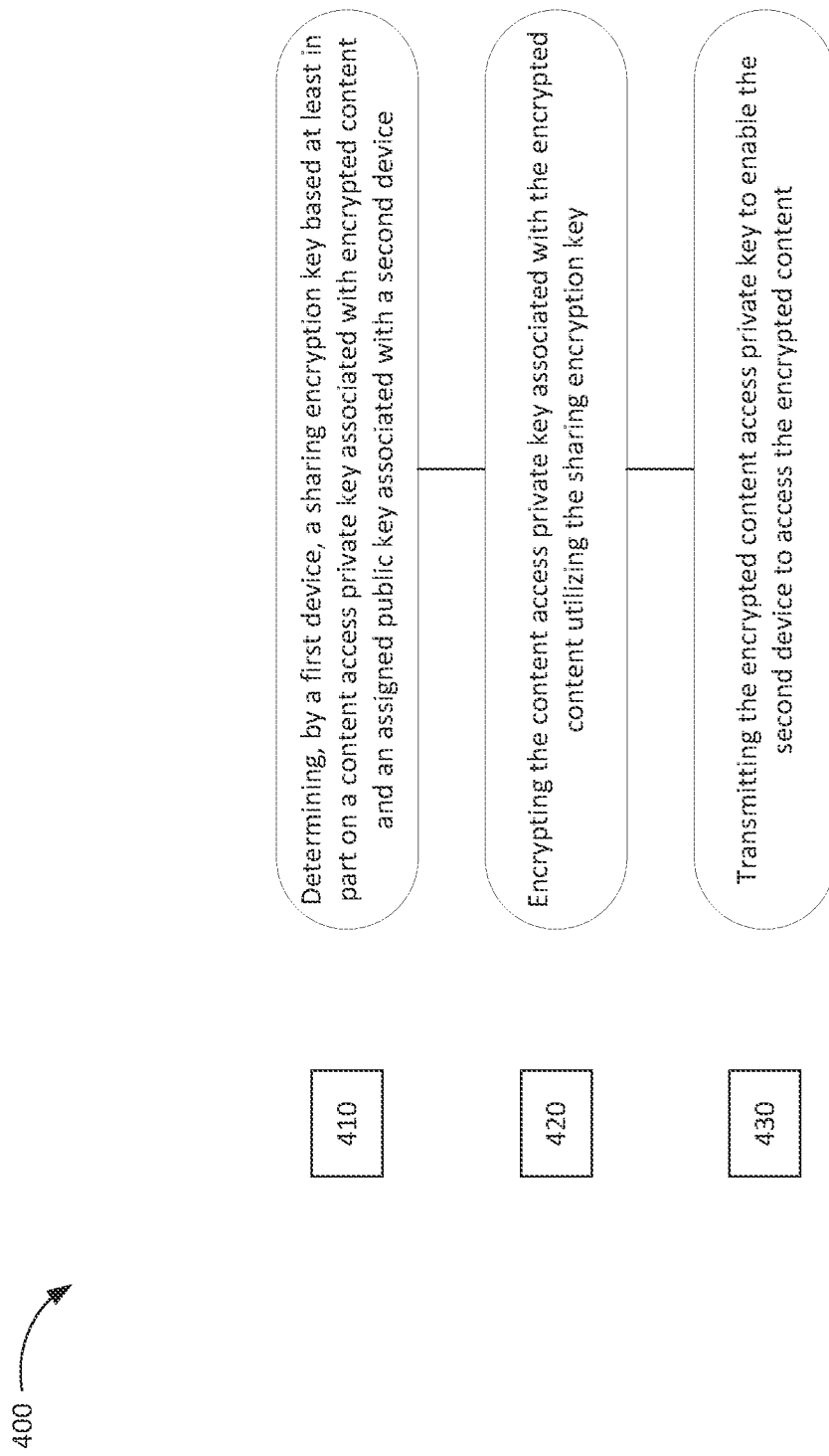

FIG. 4 is an illustration of an example process associated with sharing access to data, according to various aspects of the present disclosure.

Figure 5:
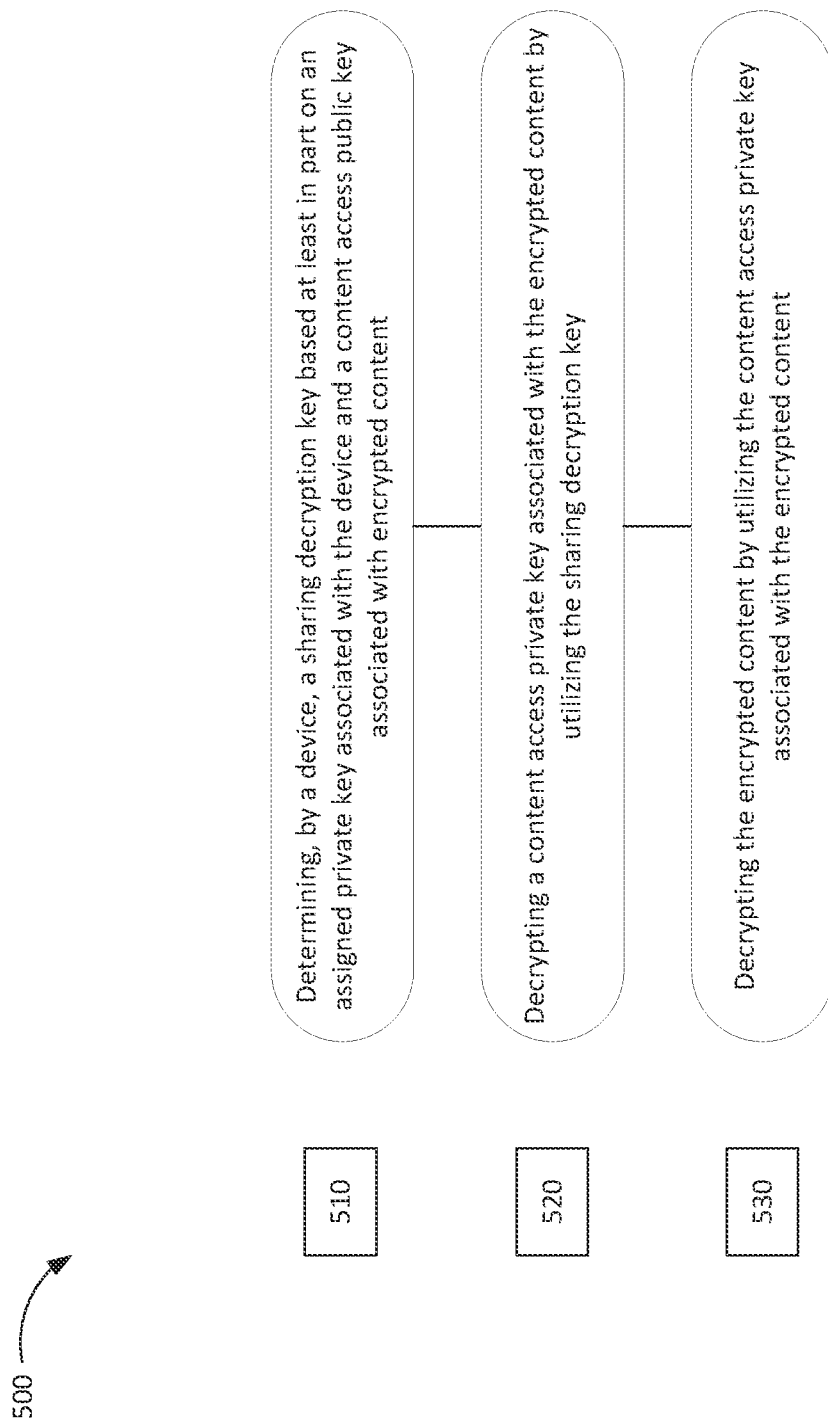

FIG. 5 is an illustration of an example process associated sharing access to data, according to various aspects of the present disclosure.

Figure 6:
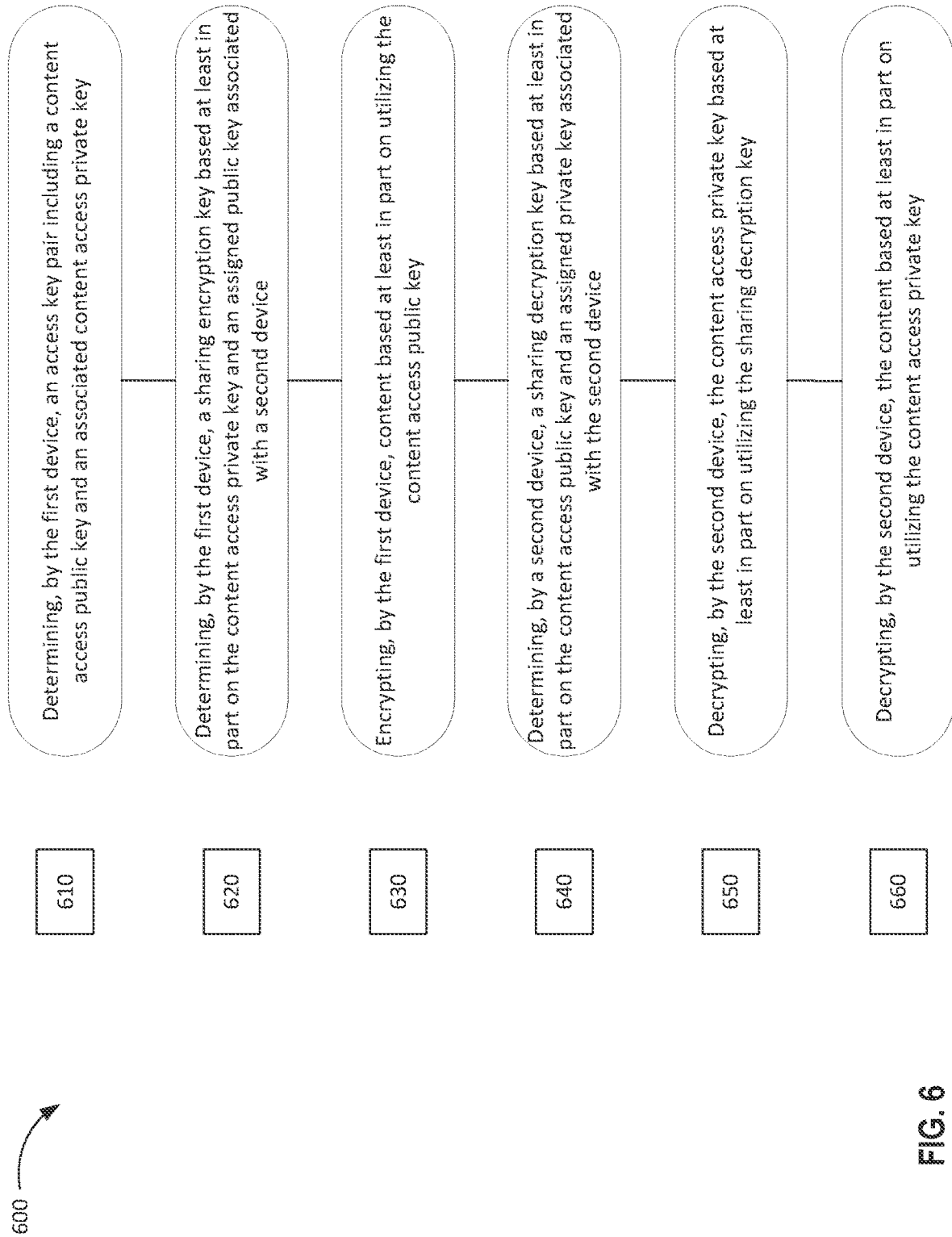

FIG. 6 is an illustration of an example process associated sharing access to data, according to various aspects of the present disclosure.

Figure 7:
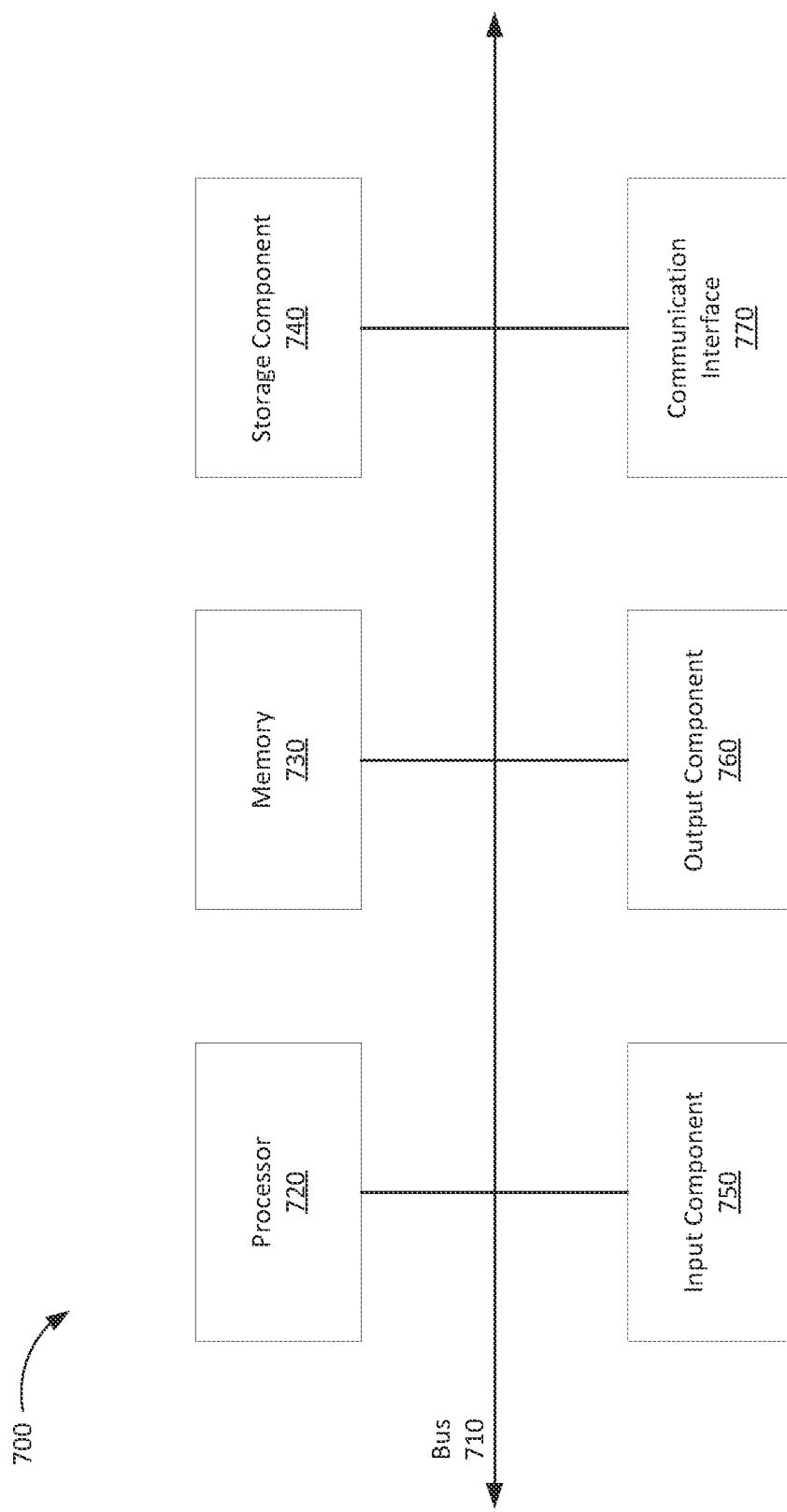

FIG. 7 is an illustration of example devices associated with sharing access to data, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with sharing access to data, according to various aspects of the present disclosure. The system 100 includes one or more user devices 102 communicating a stateless infrastructure 110 including a processing unit 112 and a database (e.g., memory) 114. In an example, a user device 102 may include a processing unit 106 and may utilize an installed client application 104 to communicate with an application programming interface (API) (not shown) included in the stateless infrastructure 110. In some aspects, the user device 102 and the stateless infrastructure 110 may communicate with one another over a network 120. The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

The user device 102 may be a physical computing device capable of hosting a client application and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may provide the user device 102 with a client application 104 to be installed on the user device 102. The client application 104 may enable a processor (e.g., processing unit 106, processor 520) associated with the user device 102 to encrypt and decrypt the data. In some aspects, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest—Shamir—Adleman (RSA) encryption standard, Open PGP standards, file encryption overview, disk encryption overview, email encryption overview, etc. Some examples of encryption algorithms include a triple data encryption standard (DES) algorithm, Rivest—Shamir— Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

In some aspects, data may include any information such as private information including, for example, bank account numbers, credit card numbers, various passwords, etc. In some aspects, the data may include electronic information included in files such as, for example, photographs, documents, compact discs (CDs), digital video disks (DVDs), etc. including written, printed, and/or electronic matter that provides information and/or evidence.

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with encrypting and decrypting the data, including encrypted content and/or encrypted key information. In some aspects, the stateless infrastructure 110 may include an application programming interface (API) (not shown) to communicate with the client application 104. The stateless infrastructure 110 may include or be associated with a communication interface to communicate (e.g., transmit and/or receive) data.

As indicated above, FIG. 1 is provided as an example. Other examples may differ from what is described with regard to FIG. 1.

A user device may request data storage services from a data storage service provider (DSSP). Such data storage services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, one-time passwords, one-time tokens, or the like) to gain authorized access to the stored data. The data storage services may be available via use of a web interface and/or an application interface.

In some instances, the DSSP may fail to protect the stored data. In an example, a third party may gain unauthorized access to the stored data by, for example, hacking into the servers and/or storage devices managed by the DSSP. In another example, internal devices associated with the DSSP that have access to the servers and/or storage devices managed by the DSSP may gain unauthorized access to the stored data. As a result, an integrity associated with the stored data may be compromised. To regain access to the stored data and/or to protect the stored data, the user device and/or the DSSP may expend resources (e.g., management resources, memory resources, computational/processing resources, power consumption resources, system bandwidth, network resources, etc.) that may otherwise be used for more suitable tasks associated with the data storage services.

Various aspects of systems and techniques discussed in the present disclosure enable encrypting and decrypting data. In some aspects, a DSSP may provide a stateless system including a stateless infrastructure and/or a client application installed on a user device. In some aspects, the stateless infrastructure may provide the user device with the client application. In some aspects, the client application may enable the user device to encrypt and decrypt the data that the user device may wish to protect. In an example, the client application may enable the user device to encrypt data, to store the encrypted data, and to decrypt the encrypted data. In some aspects, the user device may encrypt the data, store the encrypted data, and decrypt the encrypted data without the stateless infrastructure having access to unencrypted data. As a result, even if a third party gains unauthorized access to the client application and/or the stateless infrastructure, the unauthorized access may lead to encrypted data, which the third party may not be able to decrypt. The client application and/or the stateless infrastructure may employ a particular arrangement of keys to encrypt and decrypt the data. Such particular arrangement of keys may be critical because it enables the client application and/or the stateless infrastructure to provide data storage services (e.g., protect stored data) without having access to unencrypted data. In this way, the client application and/or the stateless infrastructure may mitigate instances of the data becoming compromised, thereby enabling efficient utilization of resources (e.g., management resources, memory resources, computational/processing resources, power consumption resources, system bandwidth, network resources, etc.) associated with the user device and/or the stateless infrastructure for more suitable tasks related to the data storage services.

Additional aspects of systems and techniques discussed herein enable the stateless system to manage access to encrypted data. For instance, the stateless system may enable authorized access to the encrypted data and may prevent unauthorized access to the encrypted data. In some aspects, as discussed below in further detail, the stateless system may provide one or more relationships using a particular key arrangement. Such particular key arrangement may be critical because it enables authorized access to the encrypted data and prevents unauthorized access to the encrypted data without having access to unencrypted data.

Additional aspects of systems and techniques discussed herein enable the stateless system to share access to encrypted data. For instance, the stateless system may enable encrypted content associated with a first registered account to be shared with a second registered account without having access to unencrypted data (e.g., content, key information, etc.). In some aspects, as discussed below in further detail, a client application installed on a user device associated with the first registered account may provide one or more relationships using a particular key arrangement to enable a user device associated with the second registered account to gain authorized access to the encrypted content. Such particular key arrangement may be critical because it enables the authorized access without having access to unencrypted data.

In some aspects, the client application and/or the stateless infrastructure may determine a sharing encryption key based at least in part on an access private key associated with encrypted content and an assigned public key associated with a second user device; encrypt the access private key associated with the encrypted content utilizing the sharing encryption key; and transmit the encrypted access private key to enable the second user device to access the encrypted content.

FIG. 2 is an illustration of an example flow 200 associated with sharing access to data, according to various aspects of the present disclosure. The example flow 200 may include a user device 102 in communication with a stateless infrastructure 110. In some aspects, the user device 102 may install a client application 104 associated with the stateless infrastructure 110 and may use the client application 104 to communicate with an application programming interface (API) and a processor (e.g., processing unit 112, processor 520) associated with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, or the like. In some aspects, the user device 102 may set up an access system including, for example, username, password, or the like to subsequently gain access to the registered account.

In some aspects, the stateless infrastructure 110 may provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the stateless infrastructure 110.

As shown by reference numeral 220, the client application 104 may determine information based at least in part on the registration of the account with the stateless infrastructure 110. In an example, the client application 104 may determine an asymmetric assigned key pair for the registered account associated with user device 102. In some aspects, the assigned key pair may be unique to the registered account and may include an assigned public key and an assigned private key. In this way, the assigned public key and the assigned private key may be account-specific. The assigned public key and the assigned private key may be associated with each other via, for example, a mathematical function. As a result, data encrypted using the assigned public key may be decrypted by utilizing the assigned private key. In some aspects, the determined assigned key pair may be unique to and/or may it be associated with the registered account.

Further, the client application 104 may receive a master string of alphanumeric characters from the user device 102. In some aspects, the master string may be unique and be associated with the registered account associated with the user device 102. Based at least in part on receiving the master string, the client application 104 may determine a master key. In some aspects, the client application 104 may utilize a password derivation function and/or a key derivation function to determine the master key based at least in part on the master string. The password derivation function and/or the key derivation function may perform password hashing to determine the master key. The client application 104 may utilize the master key to encrypt the assigned private key associated with the registered account.

As shown by reference numeral 230, the client application 104 may transmit, and the stateless infrastructure 110 may receive, at least a portion of the information determined by the client application 104. For instance, the client application 104 may transmit, for example, the assigned public key and the encrypted assigned private key to the stateless infrastructure 110. The stateless infrastructure 110 may store the received information in association with the registered account associated with the user device 102. In some aspects, when another device associated with the registered account (e.g., another device owned by and/or available to the owner of the user device 102) wishes to decrypt the encrypted content, the stateless infrastructure 110 may provide such information to the other device.

As shown by reference numeral 240, when the user device 102 wishes to encrypt data, the client application 104 may determine a symmetric key and an access key pair. In some aspects, the client application 104 may determine respective symmetric keys and access key pairs for each piece of data (e.g., content) that the user device 102 may wish to encrypt. In this way, the symmetric key and the access key pair (e.g., content access key pair) may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc.

For given content, the client application 104 may utilize a random bit generator to determine the symmetric key. In this case, the symmetric key may be a random key including a sequence of unpredictable and unbiased information. Further, the client application 104 may determine an access key pair (e.g., content access key pair) including an access public key (e.g., content access public key) and an access private key (e.g., content access private key). The access public key and the access private key may be associated with each other via, for example, a mathematical function. As a result, data encrypted using the access public key may be decrypted by utilizing the access private key.

The client application 104 may utilize the symmetric key and the access key pair to encrypt the content. In an example, the client application 104 may encrypt the access private key using the assigned public key associated with the registered account. The client application 104 may encrypt the symmetric key using the access public key. The client application 104 may encrypt the content using the symmetric key.

In some aspects, the client application 104 may enable the user device 102 to store the encrypted content. For instance, the user device 102 may store the encrypted content locally and/or remotely. In an example, the user device 102 may store the encrypted content in a local memory and/or a remote memory associated with the user device 102. In another example, the user device 102 may store the encrypted content in a data storage associated with data storage services provided by the stateless system. In yet another example, the user device 102 may store the encrypted content in a hand-held memory (e.g., a USB thumb drive, flash drive, etc.).

As shown by reference numeral 250, the client application 104 may transmit, and the stateless infrastructure 110 may receive, at least a portion of the information determined by the client application 104. For instance, the client application 104 may transmit one or more of the access public key, the encrypted access private key, the encrypted symmetric key, or the encrypted data to the stateless infrastructure 110. In some aspects, when another device associated with the registered account (e.g., another device owned by and/or available to the owner of the user device 102) wishes to decrypt the encrypted content, the stateless infrastructure 110 may provide such information to the other device.

When the user device 102 (or the other device associated with the registered account) may wish to decrypt the encrypted content, the user device 102 (e.g., or the other device) may access the registered account and request the encrypted assigned private key. Based at least in part on receiving the request, as shown by reference numeral 260, the stateless infrastructure 110 may transmit, and the client application 104 may receive, the encrypted assigned private key. In some aspects, as shown by reference numeral 270, when the user device 102 and/or the other device may not have access to the encrypted content, the stateless infrastructure 110 may also transmit the encrypted access private key, the encrypted symmetric key, and the encrypted content to the user device 102 and/or the other device.

Based at least in part on receiving the encrypted assigned private key, the encrypted access private key, the encrypted symmetric key, and/or the encrypted content, the client application 104 may be enabled to decrypt the content. For instance, the client application 104 may request entry of the master string and based at least in part on receiving the master string, the client application 104 may determine the master key that was utilized to encrypt the assigned private key. The client application 104 may utilize the master key to decrypt the assigned private key. The client application 104 may utilize the assigned private key to decrypt the encrypted access private key based at least in part on an association between the assigned private key and the assigned public key. Further, the client application 104 may utilize the access private key to decrypt the symmetric key based at least in part on an association between the access private key and the access public key. As shown by reference numeral 280, the client application 104 may utilize the symmetric key to decrypt the content.

In some aspects, one or more functionalities performed by the client application 104 may be included in and/or may be performed by the stateless infrastructure 110, and vice versa.

By utilizing the above critical arrangement, the stateless infrastructure 110 may enable the client application 104 and/or the stateless infrastructure 110 to provide data storage services (e.g., protect data) without having access to unencrypted content. For instance, the stateless infrastructure 110 may not have access to and/or store information such as the master string, the master key, access key pair, content, etc. may not be stored in unencrypted form. Additionally, the client application 104 and/or the stateless system 110 may mitigate instances of the data becoming compromised, thereby enabling efficient utilization of resources (e.g., management resources, memory resources, computational/processing resources, power consumption resources, system bandwidth, network resources, etc.) associated with the user device 102 and/or the stateless system 110 for more suitable tasks related to the data storage services.

Additional aspects of systems and techniques discussed herein enable the stateless system to manage access to the encrypted content. For instance, when the user device 102 stores encrypted content in a memory associated with the stateless system (e.g., managed by the stateless system, owned by a provider of the stateless system, a memory that the stateless system is responsible to manage, etc.), the stateless system may enable authorized access to the encrypted content and may prevent unauthorized access to the encrypted content. In some aspects, as discussed below in further detail, the stateless system may use a particular key arrangement to provide one or more relationships. Such particular key arrangement may be critical because it enables authorized access to the encrypted content and prevents unauthorized access to the encrypted content.

In some aspects, the stateless system (e.g., client application 104 and/or the stateless infrastructure 110) may manage access to a plurality of encrypted contents associated with a plurality of registered accounts. For instance, as shown in FIG. 7, a memory (e.g., database 114) may contain a plurality of encrypted contents (e.g., Content 1, Content 2, Content 3, Content 4, Content 5, and Content 6). Although six encrypted contents are discussed in FIG. 3, the present disclosure contemplates the memory to contain any amount (e.g., number) of encrypted contents. One or more of the plurality of encrypted contents may be associated with one or more registered accounts registered by user devices (e.g., user devices 102). For instance, the one or more user devices associated with the one or more registered accounts may have authorization to access one or more of the plurality of encrypted contents.

In an example, Registered Account 1, associated with user device 1, may be authorized to access Content 1 and Content 6; Registered Account 2, associated with user device 2, may be authorized to access Content 2, Content 3, and Content 4; and Registered Account 3, associated with user device 3, may be authorized to access Content 1 and Content 5. A registered account and/or associated user device may not access encrypted content that the register account and/or associated user device is not authorized to access. The stateless system may manage access of the registered account and/or the user devices to the plurality of encrypted contents.

In some aspects, the stateless system may manage the access by providing relationships between the registered accounts and the plurality of encrypted contents. For instance, the stateless system may provide relationships between Registered Account 1 and Content 1, Registered Account 1 and Content 6, Registered Account 2 and Content 2, Registered Account 2 and Content 3, Registered Account 2 and Content 4, Registered Account 3 and Content 1, and Registered Account 3 and Content 5.

To provide the relationships, the stateless system may utilize (i) respective assigned key pairs associated with respective registered accounts (and/or user devices) and (ii) respective access key pairs associated with respective encrypted contents.

In an example, with respect to Registered Account 1, the client application 104 may encrypt the access private key, associated with Content 1 (or Content 6), with a combination encryption key determined by combining the access private key and the assigned public key, associated with Registered Account 1. This may be the relationship between Registered Account 1 and Content 1. In some aspects, the combination encryption key may be determined utilizing an authenticated encryption algorithm (e.g., Galois/Counter Mode (GCM), Galois Message Authentication Code (GMAC) algorithm) associated with a symmetric key cipher (e.g., block cipher, stream cipher, etc.).

When a user device (e.g., user device 102 and/or another device) associated with Registered Account 1 wishes to access Content 1, the client application 104 may receive the master string associated with Registered Account 1 from the user device. The client application 104 may determine the master key based at least in part on receiving the master string. Further, the client application 104 may utilize the master key to decrypt the assigned private key associated with Registered Account 1. The client application 104 may determine a combination decryption key by combining the assigned private key and the access public key associated with Content 1. The client application 104 may utilize the combination decryption key to decrypt the encrypted access private key. The client application 104 may utilize access private key to decrypt the symmetric key, and may utilize the symmetric key to decrypt Content 1. In some aspects, the combination encryption key may be the same as the combination decryption key. In other words, the combination key may be a symmetric key.

Similarly, with respect to Registered Account 2, the client application 104 may encrypt the access private key, associated with Content 2 (or Content 3 or Content 4), with a combination encryption key determined by combining the access private key and the assigned public key, associated with Registered Account 2. This may be the relationship between Registered Account 2 and Content 2. In some aspects, the combination encryption key may be determined utilizing an authenticated encryption algorithm (e.g., Galois/Counter Mode (GCM), Galois Message Authentication Code (GMAC) algorithm) associated with a symmetric key cipher.

When a user device (e.g., user device 102 and/or another device) associated with Registered Account 2 wishes to access Content 2, the client application 104 may receive the master string associated with Registered Account 2 from the user device. The client application 104 may determine the master key based at least in part on receiving the master string. Further, client application 104 may utilize the master key to decrypt the assigned private key associated with Registered Account 2. The client application 104 may determine a combination decryption key by combining the assigned private key and the access public key associated with Content 2. The client application 104 may utilize the combination decryption key to decrypt the encrypted access private key. The client application 104 may utilize access private key to decrypt the symmetric key, and may utilize the symmetric key to decrypt Content 2. In some aspects, the combination encryption key may be the same as the combination decryption key. In other words, the combination key may be a symmetric key.

Similarly, with respect to Registered Account 3, the client application 104 may encrypt the access private key, associated with Content 1 (or Content 5), with a combination encryption key determined by combining the access private key and the assigned public key, associated with Registered Account 3. This may be the relationship between Registered Account 3 and Content 1. In some aspects, the combination encryption key may be determined utilizing an authenticated encryption algorithm (e.g., Galois/Counter Mode (GCM), Galois Message Authentication Code (GMAC) algorithm) associated with a symmetric key cipher.

When a user device (e.g., user device 102 and/or another device) associated with Registered Account 3 wishes to access Content 1, the client application 104 may receive the master string associated with Registered Account 3 from the user device. The client application 104 may determine the master key based at least in part on receiving the master string. Further, the client application 104 may utilize the master key to determine the assigned private key associated with Registered Account 3. The client application 104 may determine the combination decryption key by combining the assigned private key and the access public key associated with Content 1. The client application 104 may utilize the combination decryption key to decrypt the encrypted access private key. The client application 104 may utilize access private key to determine the symmetric key, and may utilize the symmetric key to decrypt Content 1. In some aspects, the combination encryption key may be the same as the combination decryption key. In other words, the combination key may be a symmetric key.

In some aspects, because Registered Account 1 and Registered Account 3 have access to Content 1, the stateless system may configure the (i) combination decryption key determined by combining the assigned private key associated with Registered Account 1 and the access public key associated with Content 1 and the (ii) combination decryption key determined by combining the assigned private key associated with Registered Account 3 and the access public key associated with Content 1 to enable decryption of the access private key associated with Content 1. As a result, user devices associated with Registered Account 1 and user devices associated with Registered Account 3 may have authorized access to Content 1 utilizing respective assigned private keys, as discussed elsewhere herein.

In this way, by utilizing the above critical arrangement, the stateless system may provide data storage services (e.g., protect data) without having access to unencrypted content (and/or unencrypted keys). Further, by utilizing the above critical arrangement, the stateless system may manage access to the encrypted content by enabling authorized access and preventing unauthorized access.

As indicated above, FIG. 2 is provided as an example. Other examples may differ from what is described with regard to FIG. 2.

FIG. 3 is an illustration of an example flow 300 associated with sharing access to data, according to various aspects of the present disclosure. The example flow 300 may include a first user device (e.g., user device 102), stateless infrastructure 110, and a second user device (e.g., user device 102) in communication with each other. In some aspects, the first user device may install a first client application (e.g., client application 104) and the second user device may install a second client application (e.g., client application 104), the first client application and the second client application being associated with the stateless infrastructure 110. The first user device and the second user device may use the respective client applications to communicate with an application programming interface (API) and a processor (e.g., processing unit 112, processor 520) associated with the stateless infrastructure 110. In some aspects, the first user device, the stateless infrastructure, and the second user device may communicate with each other over a network (e.g., network 120).

In some aspects, the first user device may be associated with a first registered account and may have authorized access to encrypted content. The first user device may wish to share the encrypted content with the second user device that may be associated with a second registered account. In some aspects, the first user device may share the encrypted content with the second user device by granting the second user device authorized access to the encrypted content.

To grant the second user device the authorized access, as shown by reference numeral 310, the first user device may transmit, and the stateless infrastructure 110 may receive, a request for an assigned public key associated with the second registered account.

Based at least in part on receiving the request, as shown by reference numeral 320, the stateless infrastructure 110 may transmit, and the first user device may receive, the assigned public key associated with the second registered account. In some aspects, prior to transmitting the assigned public key associated with the second registered account, the stateless infrastructure 110 may communicate with the second user device to inform the second user device that the first user device wishes to share encrypted content with a device associated with the second registered account (e.g., the second user device) and to receive confirmation that the second user device agrees to receive the encrypted content. Based at least in part on receiving the confirmation, the stateless infrastructure 110 may transmit the assigned public key associated with the second registered account to the first user device.

As shown by reference numeral 330, the first user device may communicate with the second user device to verify authenticity of the assigned public key associated with the second registered account that is received by the first user device. To verify the authenticity, the first user device may encrypt sample data utilizing the assigned public key associated with the second registered account and transmit the encrypted sample data to the second user device. Further, the first user device may consider the authenticity verified based at least in part on receiving the decrypted sample data from the second user device. In some aspects, the first user device may determine that the second user device is associated with the second registered account based at least in part on the second user device being able to use the assigned private key associated with the second registered account to decrypt the encrypted sample data.

Based at least in part on verifying the authenticity of the assigned public key associated with the second registered account, as shown by reference numeral 340, the first user device may use the first client application to provide a relationship between the encrypted content and the second registered account. In an example, the first client application may utilize the assigned public key associated with the second registered account and the access private key associated with the encrypted content. For instance, the first client application may determine a sharing encryption key based at least in part on combining the assigned public key associated with the second registered account and the access private key associated with the encrypted content. The first application may utilize the sharing encryption key to encrypt the access private key associated with the encrypted content. This may be the relationship between the second registered account and the encrypted content. In some aspects, the sharing encryption key may be determined utilizing an authenticated encryption algorithm (e.g., Galois/Counter Mode (GCM), Galois Message Authentication Code (GMAC) algorithm) associated with a symmetric key cipher (e.g., block cipher, stream cipher, etc.).

As shown by reference numeral 350, the first user device may transmit (e.g., share) an encrypted payload to the stateless infrastructure 110. In some aspects, the encrypted payload may include the encrypted access private key associated with the encrypted content. Further, the encrypted payload may include information associated with the second registered account, the information indicating that the encrypted access private key has been encrypted using the assigned public key associated with the second registered account.

Based at least in part on receiving the encrypted payload, as shown by reference numeral 360, the stateless infrastructure 110 may associate the encrypted access private key with the second registered account. As discussed below in further detail, a user device (e.g., the second user device) associated with the second registered account may request the encrypted access private key to gain authorized access to the encrypted content.

When the second user device wishes to access the encrypted content, as shown by reference numeral 370, the second user device may transmit a request to access the encrypted content to the stateless infrastructure 110. In some aspects, the request may include a request for the encrypted access private key associated with the encrypted content. Further, the request may include a request for the encrypted content.

Based at least in part on receiving the request to access the encrypted content, as shown by reference numeral 380, the stateless infrastructure 110 may provide access to the second user device by transmitting the encrypted access private key and/or the encrypted content to the second user device. Prior to providing the access, the stateless infrastructure 110 may confirm that the stateless infrastructure 110 has associated (e.g., block 360) the encrypted access private key with a registered account (e.g., the second registered account) associated with the second user device that is requesting the access.

Based at least in part on receiving the encrypted access private key and/or the encrypted content, as shown by reference numeral 390, the second user device may utilize the second client application to decrypt the encrypted content. In some aspects, the second client application may receive a master string associated with the second registered account. The second client application may determine a master key associated with the second registered account based at least in part on the master string associated with the second registered account. Further, the second client application may utilize the master key to decrypt the assigned private key associated with the second registered account. The second client application may determine a sharing decryption key based at least in part on combining the assigned private key associated with the second registered account and the access public key associated with the encrypted content. The second client application may utilize the sharing decryption key to decrypt the encrypted access private key associated with the encrypted content that was received from the stateless infrastructure 110 (e.g., block 380). In some aspects, the sharing decryption key may be the same as the sharing encryption key. In other words, the sharing encryption/decryption key is symmetric. The second client application may utilize the access private key to decrypt the randomly generated key that is encrypted utilizing the access public key associated with the encrypted content. In some aspects, the second client application may utilize an association between the access private key and the access public key (both associated with the encrypted content) to decrypt the randomly generated key. The second client application may utilize the randomly generated key to decrypt the encrypted content. In this way, the second user device, associated with the second registered account, a gain authorized access to the encrypted content.

By utilizing the systems and techniques discussed herein, the stateless system may enable the first user device, associated with the first registered account, to share authorized access to encrypted data with the second user device, associated with the second registered account. The particular key arrangement utilized by the stateless system may be critical because it enables the authorized access without having access to unencrypted data (e.g., content, key information, etc.).

As indicated above, FIG. 3 is provided as an example. Other examples may differ from what is described with regard to FIG. 3.

FIG. 4 is an illustration of an example process 400 associated with sharing access to data, according to various aspects of the present disclosure. In some aspects, the process 400 may be performed by respective memories and respective processors/controllers (e.g., processor 106, processor 720) associated with one or more user devices (e.g., user device 102) executing respective client applications and/or by a memory and/or a processor/controller (e.g., processing unit 112, processor 720) associated with a stateless infrastructure (e.g., stateless infrastructure 110). As shown by reference numeral 410, process 400 may include determining, by a first device, a sharing encryption key based at least in part on a content access private key associated with encrypted content and an assigned public key associated with a second device. For instance, the user device and/or the stateless infrastructure may utilize the associated processor/controller to determine a sharing encryption key based at least in part on a content access private key associated with encrypted content and an assigned public key associated with a second device, as discussed elsewhere herein.

As shown by reference numeral 420, process 400 may include encrypting the content access private key associated with the encrypted content utilizing the sharing encryption key. For instance, the user device and/or the stateless infrastructure may utilize the associated processor/controller to encrypt the content access private key associated with the encrypted content utilizing the sharing encryption key, as discussed elsewhere herein.

As shown by reference numeral 430, process 400 may include transmitting the encrypted content access private key to enable the second device to access the encrypted content. For instance, the user device and/or the stateless infrastructure may utilize the associated processor/controller to transmit the encrypted content access private key to enable the second device to access the encrypted content, as discussed elsewhere herein.

Process 400 may include additional aspects, such as any single aspect or any combination of aspects described below and/or in connection with one or more other processes described elsewhere herein.

In a first aspect, process 400 may include transmitting a request to receive the assigned public key associated with the second device; and receiving, based at least in part on transmitting the request, the assigned public key associated with the second device.

In a second aspect, alone or in combination with the first aspect, process 400 may include encrypting data utilizing the assigned public key associated with the second device; transmitting the encrypted data to the second device; and receiving decrypted data from the second device.

In a third aspect, alone or in combination with the first through second aspects, in process 400, the sharing encryption key is a symmetric key.

In a fourth aspect, alone or in combination with the first through third aspects, process 400 may include encrypting the content utilizing a randomly generated key, which is a symmetric key.

In a fifth aspect, alone or in combination with the first through fourth aspects, process 400 may include verifying an authenticity of the assigned public key associated with the second device.

In a sixth aspect, alone or in combination with the first through fifth aspects, in process 400, the first device is associated with a first registered account having authorized access to the encrypted content.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with sharing access to data, according to various aspects of the present disclosure. In some aspects, the process 500 may be performed by a memory and/or a processor/controller (e.g., processor 106, processor 720) associated with a user device (e.g., user device 102) executing a client application and/or by a memory and/or a processor/controller (e.g., processing unit 112, processor 720) associated with a stateless infrastructure (e.g., stateless infrastructure 110). As shown by reference numeral 510, process 500 may include determining, by a device, a sharing decryption key based at least in part on an assigned private key associated with the device and a content access public key associated with encrypted content. For instance, the user device and/or the stateless infrastructure may utilize the associated memory and processor to determine a sharing decryption key based at least in part on an assigned private key associated with the device and a content access public key associated with encrypted content, as discussed elsewhere herein.

As shown by reference numeral 520, process 500 may include decrypting a content access private key associated with the encrypted content by utilizing the sharing decryption key. For instance, the user device and/or the stateless infrastructure may utilize the associated memory and processor to decrypt a content access private key associated with the encrypted content by utilizing the sharing decryption key, as discussed elsewhere herein.

As shown by reference numeral 530, process 500 may include decrypting the encrypted content by utilizing the content access private key associated with the encrypted content. For instance, the user device and/or the stateless infrastructure may utilize the associated memory and processor to decrypt the encrypted content by utilizing the content access private key associated with the encrypted content, as discussed elsewhere herein.

Process 500 may include additional aspects, such as any single aspect or any combination of aspects described below and/or in connection with one or more other processes described elsewhere herein.

In a first aspect, in process 500, decrypting the encrypted content comprises decrypting a randomly generated key by utilizing the content access private key, the randomly generated key being used to encrypt the content; and decrypting the encrypted content by utilizing the randomly generated key.

In a second aspect, alone or in combination with the first aspect, in process 500, the sharing decryption key is a symmetric key.

In a third aspect, alone or in combination with the first through second aspects, process 500 may include determining a master key based at least in part on a master string of alphanumeric characters associated with the device; and decrypting the assigned private key associated with the device by utilizing the master key.

In a fourth aspect, alone or in combination with the first through third aspects, process 500 may include verifying an authenticity of an assigned public key associated with the device.

In a fifth aspect, alone or in combination with the first through fourth aspects, process 500 may include transmitting a request to access the encrypted content, the request to access including a request to receive the content access private key associated with the encrypted content.

In a sixth aspect, alone or in combination with the first through fifth aspects, process 500 may include receiving a master string of alphanumeric characters associated with the device; and decrypting the assigned private key by utilizing a master key that is determined based at least in part on the master string of alphanumeric characters.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with sharing access to data, according to various aspects of the present disclosure. In some aspects, the process 600 may be performed by respective memories and respective processors/controllers (e.g., processor 106, processor 720) associated with one or more user devices (e.g., user device 102) executing respective client applications and/or by a memory and/or a processor/controller (e.g., processing unit 112, processor 720) associated with a stateless infrastructure (e.g., stateless infrastructure 110). As shown by reference numeral 610, process 600 may include determining, by the first device, an access key pair including a content access public key and an associated content access private key. For instance, a first user device and/or the stateless infrastructure may utilize the associated processor/controller to determine an access key pair including a content access public key and an associated content access private key, as discussed elsewhere herein.

As shown by reference numeral 620, process 600 may include determining, by the first device, a sharing encryption key based at least in part on the content access private key and an assigned public key associated with a second device. For instance, the first user device and/or the stateless infrastructure may utilize the associated processor/controller to determine a sharing encryption key based at least in part on the content access private key and an assigned public key associated with a second device, as discussed elsewhere herein.

As shown by reference numeral 630, process 600 may include encrypting, by the first device, content based at least in part on utilizing the content access public key. For instance, the first user device and/or the stateless infrastructure may utilize the associated processor/controller to encrypt content based at least in part on utilizing the content access public key, as discussed elsewhere herein.

As shown by reference numeral 640, process 600 may include determining, by a second device, a sharing decryption key based at least in part on the content access public key and an assigned private key associated with the second device. For instance, a second user device and/or the stateless infrastructure may utilize the associated processor/controller to determine a sharing decryption key based at least in part on the content access public key and an assigned private key associated with the second device, as discussed elsewhere herein.

As shown by reference numeral 650, process 600 may decrypting, by the second device, the content access private key based at least in part on utilizing the sharing decryption key. For instance, the second user device and/or the stateless infrastructure may utilize the associated processor/controller to decrypt the content access private key based at least in part on utilizing the sharing decryption key, as discussed elsewhere herein.

As shown by reference numeral 660, process 600 may decrypting, by the second device, the content based at least in part on utilizing the content access private key. For instance, the second user device and/or the stateless infrastructure may utilize the associated processor/controller to decrypt the content based at least in part on utilizing the content access private key, as discussed elsewhere herein.

Process 600 may include additional aspects, such as any single aspect or any combination of aspects described below and/or in connection with one or more other processes described elsewhere herein.

In a first aspect, in process 600, the sharing encryption key is symmetric with the sharing decryption key.

In a second aspect, alone or in combination with the first aspect, process 600 may include determining, by the second device, a master key based at least in part on a master string of alphanumeric characters associated with the second device; and decrypting the content access private key based at least in part on utilizing the master key.

In a third aspect, alone or in combination with the first through second aspects, in process 600, the content access public key and the content access private key are specific to the content.

In a fourth aspect, alone or in combination with the first through third aspects, in process 600, encrypting the content comprises: encrypting, by the first device, a randomly generated key based at least in part on utilizing the content access public key; and encrypting, by the first device, the content based at least in part on utilizing the randomly generated key.

In a fifth aspect, alone or in combination with the first through fourth aspects, in process 600, decrypting the content comprises: decrypting a randomly generated key based at least in part on utilizing the content access private key; and decrypting the content based at least in part on utilizing the randomly generated key.

In a sixth aspect, alone or in combination with the first through fifth aspects, process 600 may include decrypting the assigned private key based at least in part on utilizing a master string of alphanumeric characters associated with the second device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with sharing access to data, according to various aspects of the present disclosure. In some aspects, the example devices 700 may form part of or implement the systems, environments, infrastructures, components, or the like described elsewhere herein (e.g., FIG. 1 and/or FIG. 2 and/or FIG. 3) and may be used to perform the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by the first device, an access key pair including a content access public key and an associated content access private key;
    determining, by the first device, a sharing encryption key based at least in part on the content access private key and an assigned public key associated with a second device;
    encrypting, by the first device, content based at least in part on utilizing a randomly generated key and the content access public key;
    encrypting, by the first device, the content access private key based at least in part on utilizing the sharing encryption key;
    determining, by a second device, a sharing decryption key based at least in part on the content access public key and an assigned private key associated with the second device;
    decrypting, by the second device, the encrypted content access private key based at least in part on utilizing the sharing decryption key; and
    decrypting, by the second device, the encrypted content based at least in part on utilizing the content access private key, wherein
    the sharing encryption key is symmetric with the sharing decryption key.

2. The method of claim 1, further comprising:
- determining the sharing encryption key includes combining, by the first device, the content access private key and the assigned public key associated with the second device; and
- determining the sharing decryption key includes combining, by the second device, the content access public key and the assigned private key associated with the second device.

3. The method of claim 1, further comprising:
- determining, by the second device, a master key based at least in part on a master string of alphanumeric characters associated with the second device; and
- decrypting the content access private key based at least in part on utilizing the master key.

4. The method of claim 1, wherein the content access public key and the content access private key are specific to the content.

5. The method of claim 1, wherein encrypting the content comprises:
- encrypting, by the first device, the content based at least in part on utilizing the randomly generated key; and
- encrypting, by the first device, the randomly generated key based at least in part on utilizing the content access public key.

6. The method of claim 1, wherein decrypting the content comprises:
- decrypting the randomly generated key based at least in part on utilizing the content access private key; and
- decrypting the content based at least in part on utilizing the randomly generated key.

7. The method of claim 1, further comprising:
- decrypting the assigned private key based at least in part on utilizing a master string of alphanumeric characters associated with the second device.

8. A system, comprising:
- a first device configured to:
  - determine an access key pair including a content access public key and an associated content access private key;
  - determine a sharing encryption key based at least in part on the content access private key and an assigned public key associated with a second device;
  - encrypt content based at least in part on utilizing a randomly generated key and the content access public key; and
  - encrypt the content access private key based at least in part on utilizing the sharing encryption key; and
- a second device configured to:
  - determine a sharing decryption key based at least in part on the content access public key and an assigned private key associated with the second device;
  - decrypt the encrypted content access private key based at least in part on utilizing the sharing decryption key; and
  - decrypt the encrypted content based at least in part on utilizing the content access private key, wherein
- the sharing encryption key is symmetric with the sharing decryption key.

9. The system of claim 8, wherein
- to determine the sharing encryption key, the first device is configured to combine the content access private key and the assigned public key associated with the second device; and
- to determine the sharing decryption key, the second device is configured to combine the content access public key and the assigned private key associated with the second device.

10. The system of claim 8, wherein, to decrypt the content access private key, the second device is configured to:
- determine a master key based at least in part on a master string of alphanumeric characters associated with the second device; and
- decrypt the content access private key based at least in part on utilizing the master key.

11. The system of claim 8, wherein the content access public key and the content access private key are specific to the content.

12. The system of claim 8, wherein, to encrypt the content, the first device is configured to:
- encrypt the content based at least in part on utilizing the randomly generated key; and
- encrypt the randomly generated key based at least in part on utilizing the content access public key.

13. The system of claim 8, wherein, to decrypt the content, the second device is configured to:
- decrypt the randomly generated key based at least in part on utilizing the content access private key; and
- decrypt the content based at least in part on utilizing the randomly generated key.

14. The system of claim 8, wherein the second device is configured to:
- decrypt the assigned private key based at least in part on utilizing a master string of alphanumeric characters associated with the second device.

15. A non-transitory computer-readable medium configured to store instructions, which
- when executed by a first processor associated with a first device, configure the first processor to:
  - determine an access key pair including a content access public key and an associated content access private key;
  - determine a sharing encryption key based at least in part on the content access private key and an assigned public key associated with a second device;
  - encrypt content based at least in part on utilizing a randomly generated key and the content access public key; and
  - encrypt the content access private key based at least in part on utilizing the sharing encryption key; and
- when executed by a second processor associated with a second device, configure the second processor to:
  - determine a sharing decryption key based at least in part on the content access public key and an assigned private key associated with the second device;
  - decrypt the encrypted content access private key based at least in part on utilizing the sharing decryption key; and
  - decrypt the encrypted content based at least in part on utilizing the content access private key, wherein
- the sharing encryption key is symmetric with the sharing decryption key.

16. The non-transitory computer-readable medium of claim 15, wherein
- to determine the sharing encryption key, the first device is configured to combine the content access private key and the assigned public key associated with the second device; and to determine the sharing decryption key, the second device is configured to combine the content access public key and the assigned private key associated with the second device.

17. The non-transitory computer-readable medium of claim 15, wherein the second processor is configured to:
   determine a master key based at least in part on a master string of alphanumeric characters associated with the second device; and
   decrypt the content access private key based at least in part on utilizing the master key.

18. The non-transitory computer-readable medium of claim 15, wherein the content access public key and the content access private key are specific to the content.

19. The non-transitory computer-readable medium of claim 15, wherein the first processor is configured to:
   encrypt the content based at least in part on utilizing the randomly generated key; and
   encrypt the randomly generated key based at least in part on utilizing the content access public key.

20. The non-transitory computer-readable medium of claim 15, wherein the second processor is configured to:
   decrypt the randomly generated key based at least in part on utilizing the content access private key; and
   decrypt the content based at least in part on utilizing the randomly generated key.

* * * * *